June 15, 1954 R. F. KRUPP ET AL 2,681,088
CONTINUOUS FRUIT PITTING OR CORING MACHINE
Filed Aug. 3, 1951 6 Sheets-Sheet 3

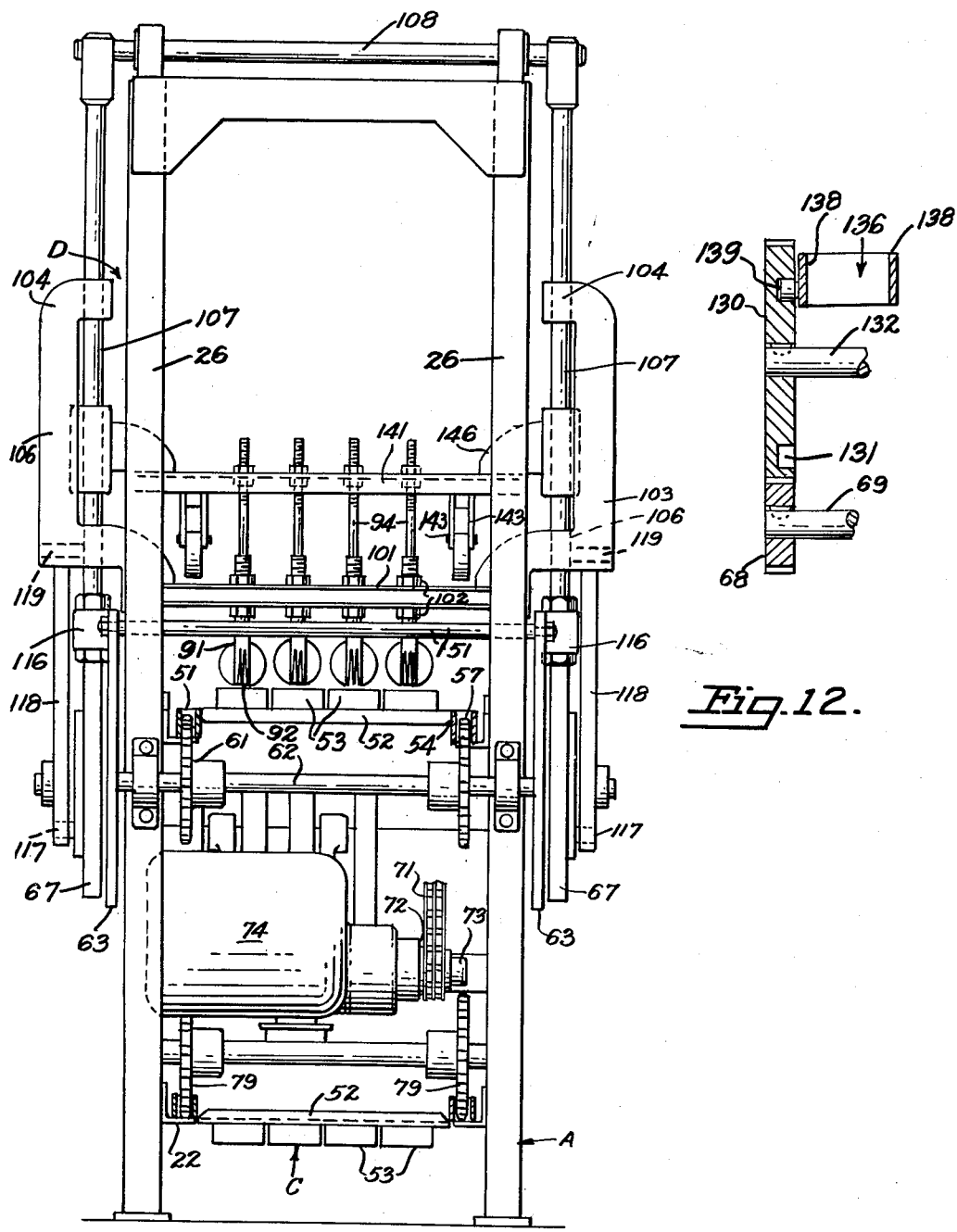

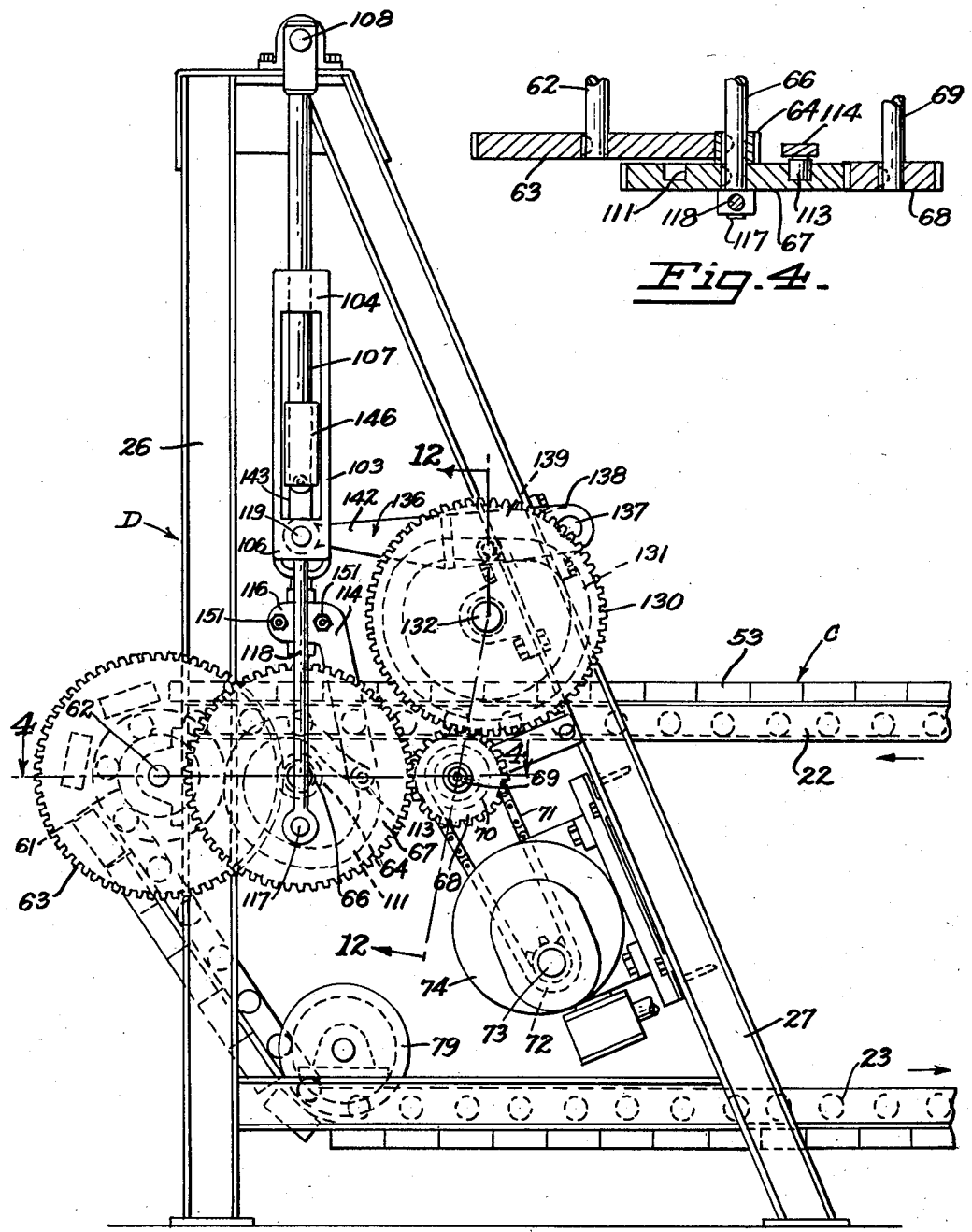

INVENTORS.
ROBERT F. KRUPP
PAUL F. LEAVITT
BY
Townsend and Townsend
ATTORNEYS

June 15, 1954 R. F. KRUPP ET AL 2,681,088
CONTINUOUS FRUIT PITTING OR CORING MACHINE
Filed Aug. 3, 1951 6 Sheets-Sheet 4
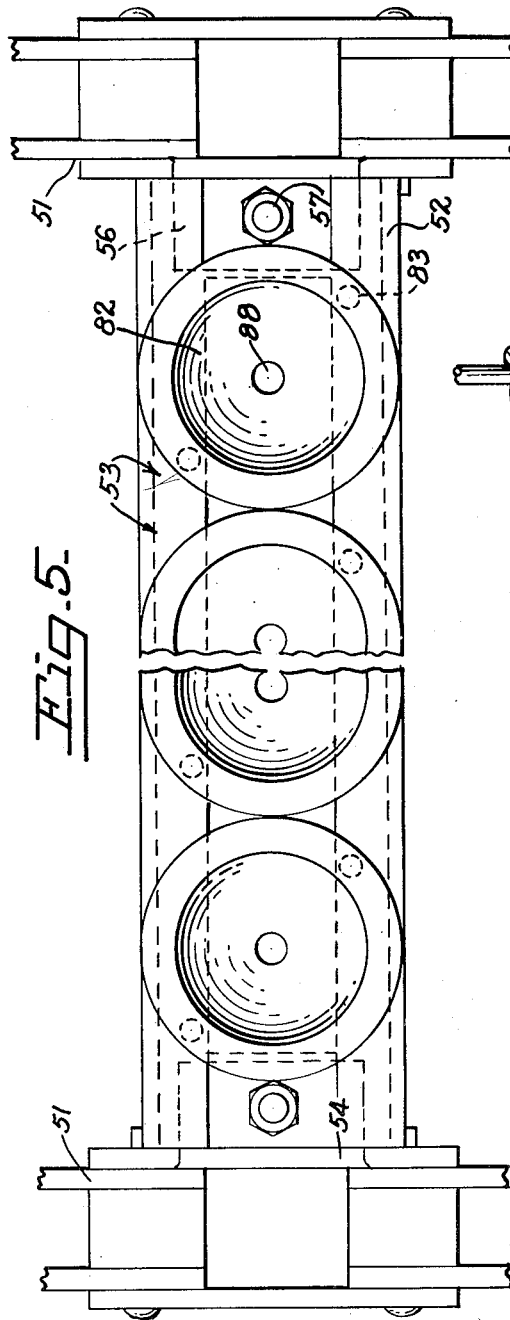
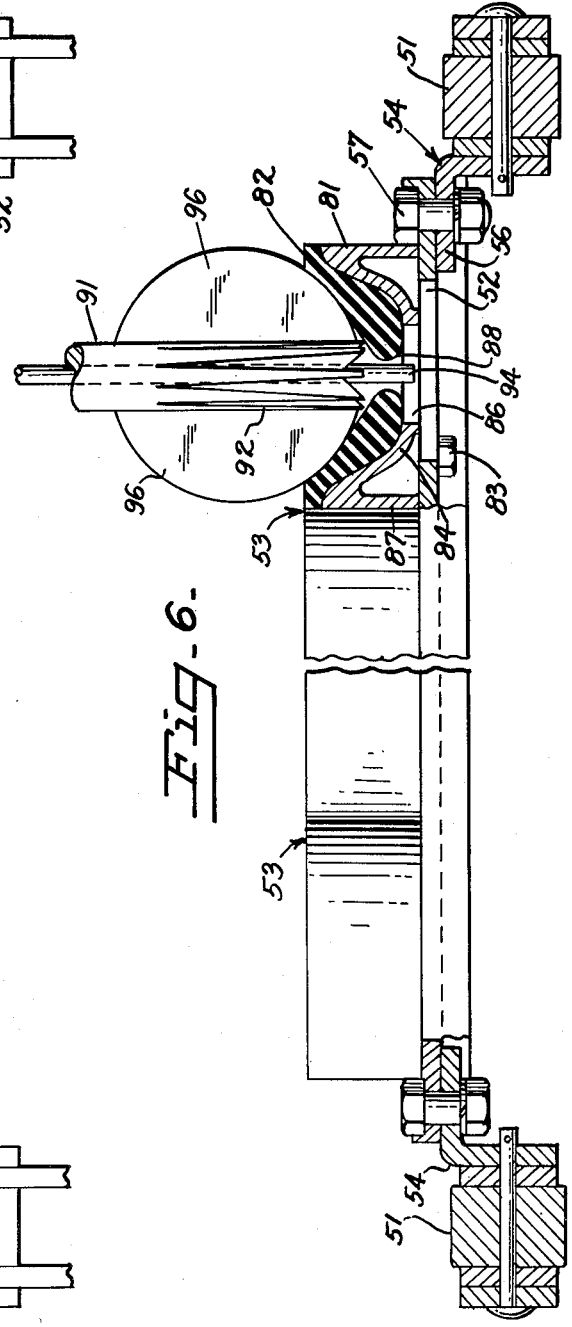
INVENTORS
ROBERT F. KRUPP
PAUL F. LEAVITT
BY
Townsend and Townsend
ATTORNEYS

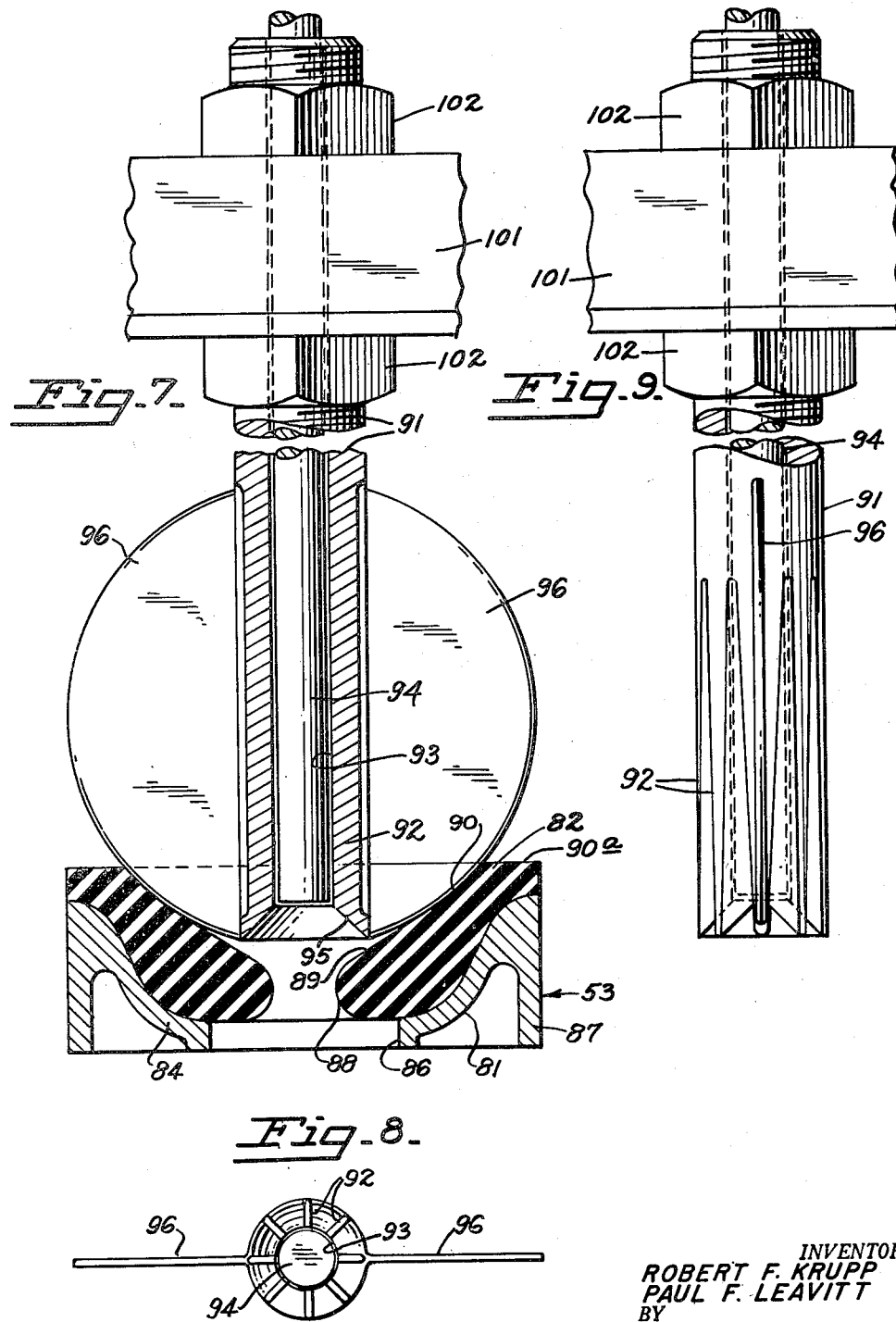

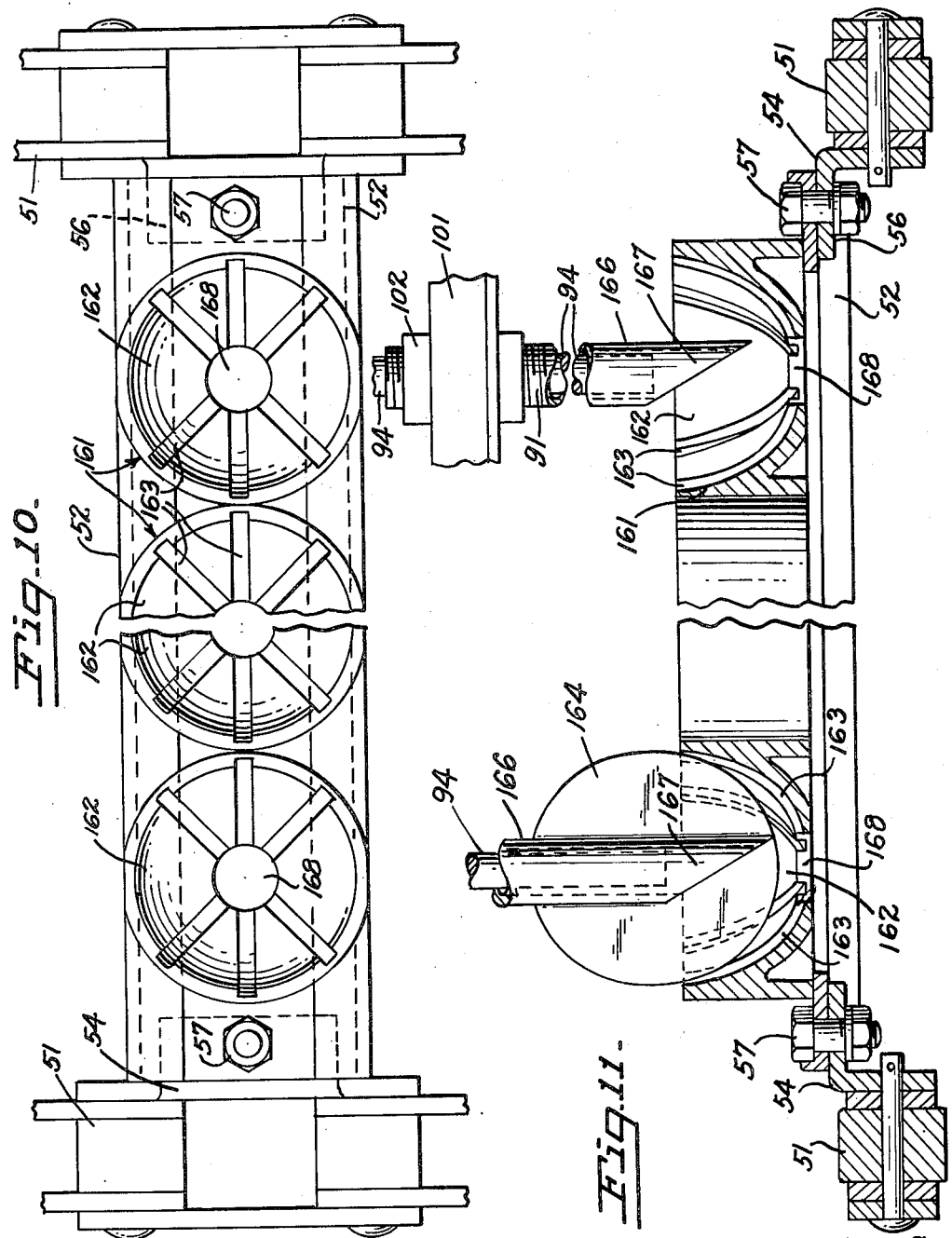

Patented June 15, 1954

2,681,088

UNITED STATES PATENT OFFICE 2,681,088

CONTINUOUS FRUIT PITTING OR CORING MACHINE

Robert F. Krupp and Paul F. Leavitt, San Lorenzo, Calif., assignors to Gerber Products Company, Fremont, Mich., a corporation of Michigan Application August 3, 1951, Serial No. 240,168

4 Claims. (Cl. 146—17)

This invention relates to continuous fruit pitting or coring machine. More particularly, the invention relates to a machine wherein fruits such as, for example, peaches and apples may be processed for the removal of pits and cores, and optionally the meat of the fruit may simultaneously be sliced into sections. One of the distinguishing features of the present invention is the fact that the fruit advances continuously rather than intermittently through the machine. In order to remove the pit or core, a plunger is provided which moves down through the fruit to locate and cut around the pit or core, and a knock-out rod which pushes the core or pit through an aperture at the bottom of the cup bearing the fruit as the plunger reaches the bottom of its stroke.

In operation, the plunger is elevated at the beginning of the cycle, indexes forwardly so as to come down through the fruit to cut out the pit or core, advancing as the fruit advances, knocks out the pit or core, elevates and then indexes forwardly so as to be in position to remove the pit or core from the next cup in order. The motion of the plunger is controlled by means of cranks and cams so that the path of said plunger is such as to perform the desired function without injuring the meat of the fruit to any considerable extent. The mechanism whereby the motion is imparted to the plunger is, therefore, one of the primary features of the present invention.

Other objects of the present invention will become apparent upon reading the following specification and referring to the accompanying drawings in which similar characters of reference represent corresponding parts in each of the several views.

Fig. 1 is an end elevation of the machine viewed from the discharge end of the machine.

Fig. 2 is a side elevation of a part of the machine.

Fig. 4 is a vertical section of a portion of the cam and crank structure governing motions of the coring and pitting plunger.

Fig. 5 is a top plan of peach carrying cups and associated mechanism.

Fig. 6 is a side elevation of the structure of Fig. 5 and also showing a vertical midsection through one cup and a portion of a plunger associated therewith.

Fig. 7 is a fragmentary view of a cup and plunger in vertical section, together with associated mechanism.

Fig. 8 is a bottom plan of a plunger.

Fig. 9 is a fragmentary elevation of a plunger and associated mechanism.

Fig. 10 is a top plan view of apple carrying cups and associated mechanism.

Fig. 11 is a vertical midsection through the structure of Fig. 10 and also showing two coring plungers, one with and one without slicing blades.

Fig. 12 is a vertical section of a portion of the cam structure governing motion of the knockout rods.

Figure 2A:
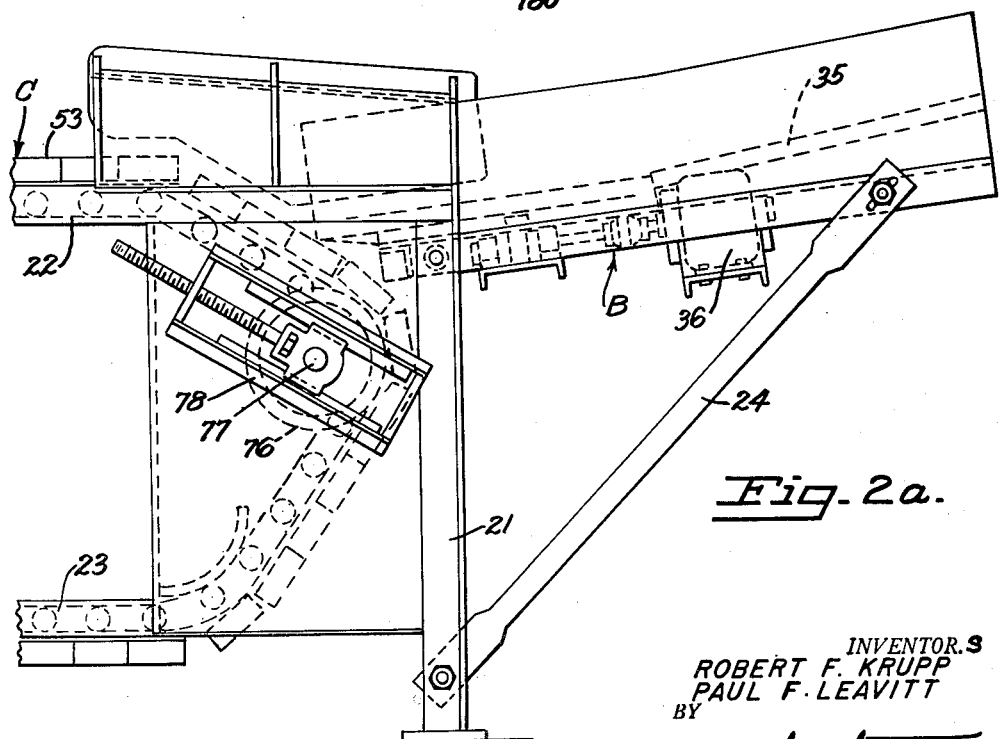
Fig. 2a is a side elevation of the remainder of the machine.

The frame A supporting the hereinafter described mechanism comprises two longitudinally disposed halves on opposite sides of the machine suitably tied together. The frame A provides a suitable support for the various stations of the machine hereinafter described. Thus, at the forward end of the machine—i. e., at the right as viewed in Fig. 2a—vertical standards 21 are provided supporting the upper and lower horizontal longitudinal frame members 22 and 23, respectively, and further braces 24 are provided for the feeder station B located proximate the front end of the machine. The upper and lower horizontal frame members 22 and 23 provide a support for the conveyor C which conveys the fruit from the feeder B to the coring and pitting mechanism D, located at the rear of the machine. The distance between the feeder B and the pitting station D is elongated so as to provide space for attendants to inspect and manually straighten the fruit in the conveying mechanism as it passes toward the coring and pitting mechanism. On opposite sides of the machine are vertical members 26 and angular members 27 joined together at the top and joined to horizontal members 22 and 23 adjacent the coring or pitting station to provide a rigid support for the coring and pitting mechanism hereinafter described and join said mechanism D to conveyor C.

The details of the feeder station B form no part of the present invention, and it may be stated that fruit is deposited on an inclined corrugated table 35 vibrated by motor 36 which allows the fruit to roll down and locate in the conveyor C hereinafter described.

The conveying mechanism C consists essentially of two parallel roller chains 51 longitudinally disposed on opposite sides of the machine, there being a plurality of transversely extending frame members 52, each frame member 52 being fastened to a link of chain 51. The frame members 52 support rows of cups 53 in which the fruit rests, as hereinafter appears.

Roller chains 51, as shown in Figs. 5 and 6, are slightly modified from conventional chains in that each inner link 54 is formed as an angle in cross-section (see especially Fig. 6) the flange 56 of said link extending toward the center of the machine and providing a means whereby transverse frame members 52 may be fixed to chain 51 by bolts 57. Chains 51 are advanced at equal speed by means of sprockets 61 on opposite sides of the rear of the machine, said sprockets being keyed to transverse shaft 62. Shaft 62 bears a large spur gear 63 meshing with spur pinion 64 on transverse shaft 66, said shaft 66 being driven by gear 67 keyed thereto, which is in turn driven by pinion 68 on shaft 69. Shaft 69 bears sprocket 70 driven by chain 71 from sprocket 72 of shaft 73 of electric motor 74. All of the mechanism hereinafter described is also driven by said electric motor 74. At the front end of the machine are idler sprockets 76 on each side mounted on shaft 77, which shaft 77 is carried by chain tightener 78 of conventional design. Idler sprockets 79 are also provided at the bottom adjacent each side of the rear of the machine to maintain chains 51 tight. Longitudinal frame members 22 and 23 are each in the shape of an inwardly facing channel so as to provide a trackway maintaining position of chains 51.

In Figs. 5, 6 and 7 are shown the fruit carrier members for peaches. The modification of the machine adapting it to the coring of apples will be hereinafter separately described. Peach cups 53 are each attached to apertured transverse frame members 52. Each cup 53 comprises a base member 81 and a rubber cup member 82. Base member 81 is cylindrical at its periphery 87 and attached to frame member 52 by bolts 83. The central portion 84 of the base member 81 is generally semi-spherical in section having an aperture 86 at the bottom of a diameter greater than the major transverse axis of a peach pit. Side edge members 87 support the central depending semi-spheroidal portion 84. Bonded to base 81 is rubber cup 82 dimensioned so as to receive a peach or other fruit and support the same. Annulus 88 in the center, of lesser diameter than the hole 86 in the base 81, is provided through which the pits may be squeezed as hereinafter described in the operation of the machine. Annulus 88 is rounded in cross-section at a radius of ¼" (see Fig. 7). Outwardly of annulus 86 the surface of cup 82 is the complement of a straight-sided cone having its side slanted to the horizontal at an angle of 30° as indicated by reference numeral 89. The portion next in order outwardly of portion 89 is a spherical section 90 having a radius of 1⅞" and a center of curvature upward from the bottom of cup 82 a distance of 2 13/32". The outer margin 90a of cup 82 is flat and horizontal. This shape has been found to be most satisfactory for peaches. A row of four cup members 53 is attached to each frame member 52 in the preferred embodiment herein illustrated. Said cup members 53 are abutting one another extending transversely across the machine. It will be understood that four peaches are disposed in the four cups of each transverse frame member 52 so that four peaches are pitted simultaneously by the pitting mechanism hereinafter described.

Above the path of the transverse frame members 52 are four hollow pitting plungers 91, one for each cup. Said plungers are formed at their anterior portions in a plurality of flutes 92. There are preferably eight thin, radially disposed flutes 92 extending outwardly from the central bore 93 of the plunger. The lower edges of each flute 92 are recessed at about a forty-five degree angle as indicated by reference numeral 95 as seen especially in Fig. 7. Thus, as the plunger moves downwardly through the peach, the flutes 92 engage the pit and move it centrally with respect to the plunger 91 so that as said plunger reaches the end of its stroke, the pit is located immediately above the hole 88 in the bottom of rubber cup member 82. Pit knockout rod 94 moves within the central bore 93 of plunger 91 and is actuated separately by a cam mechanism hereinafter described. Thus rod 94 moves downwardly as plunger 91 reaches the bottom of its stroke and pushes the peach pit through the hole 88 in the bottom of cup member 82, the resilient edge 88 of cup member performs two functions, it supports the lower half of the fruit in such manner as to retain large segments of fruit from breaking away and being wasted or badly damaged and also squeezing the meat off the pit as it passes through said hole thereby conserving the quantity of peach retained for further processing. It will be seen that a pair of semi-circular, thin bladed knives 96 is fixed to diametrically opposed flutes, said knives operating to cut the peach meat into halves as plunger 91 moves downwardly. The radius of knives 96 approximately equals the spherical portion 90 of cup 82 so that a proper slicing action is accomplished. It will be understood that instead of two knives 96, four or more could be employed as desired, or that the use of such knives may be eliminated.

The upper end of each plunger 91 passes through the crosshead 101 which extends transversely across the machine and is adjustably secured by means of nuts 102 on the top and bottom of said crosshead so that the motion of said crosshead is imparted to each of said plungers. Crosshead 101 is rigidly attached at each side of the machine to slide 103 which bears upper and lower sleeves 104 and 106, respectively, engaging pendulum rod 107. Thus, crosshead 101 may slide up and down on pendulum rod 107. Rod 107 on each side of the machine is keyed to transverse shaft 108 pivotally mounted on the top of the machine. Thus, as slide 103 reciprocates axially of pendulum rod 107, said pendulum rod is also subject to an oscillatory motion by means of its pivotal mounting.

The peculiar motion imparted to crosshead 101 is the resultant of a crank and a cam motion, imparted upon rotation of transverse shaft 66, which, as has been stated, is driven by electric motor shaft 73. The inner face of gear 67 bears groove cam 111, said cam 111 receiving cam roller 113 which is mounted on the lower end of cam follower arm 114, of dog-legged shape, the upper end of which is fixed to the lower end of pendulum rod 107 by means of fitting 116. The face of gear 67 opposite cam 111 is provided with eccentric crank pin 117 to which is attached the lower end of connecting rod 118, the upper end of which is attached to pin 119 to slide 103 and thus to crosshead 101. As shaft 66 rotates, the lower end of pendulum rod 107 is given a movement defined by cam 111. At the same time crosshead 101 is caused to slide on pendulum rod 107 by reason of the eccentricity of crank pin 117 on the opposite face of cam 111.

Knockout rods 94 which slide within the bore 93 of hollow plungers 91 receive a motion which is a combination of the motion of said plungers 91 and an independent motion imparted thereto by face cam 131 on the inner face of gear 130 on transverse shaft 132. Gear 130 is driven from motor 74 by pinion 68 on shaft 69. Two pit punchout arms 136 are mounted on shaft 137, which shaft extends transversely across the machine and supported by frame members 27. Arms 136 are bifurcated at the ends adjacent shaft 137, the bifurcations 138 receiving shaft 137. The outer bifurcation 138 carries cam roller 139 engaging the groove 131 in cam 130. The upper ends of rods 94 are held by transverse frame 141 and the ends 142 of arms 136 are connected to frame 141 by pivot links 143. Slide 146 is attached to frame 141 at its lower end and its upper end slides on rod 107. Thus, frame 141 swings with rod 107 and is moved up and down on rod 107 by cam 131, the motion of which is transmitted by follower 139, arm 136 and links 143. Rods 94 receive the motion of frame 141 and slide within plungers 91.

Operation of pitter

Figure 3:
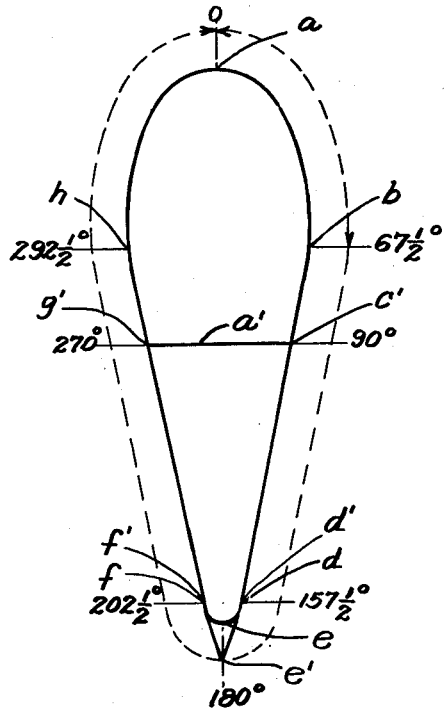
Fig. 3 is a schematic view of the motion imparted to the fruit plungers and knockout rods.

Peaches are deposited in feeder B and flow down through troughs in table 35 so that a peach is deposited in each of the cups 82 as said cups 82 pass under the lower end of said feeder. As the peaches travel on the conveyor C from the feeder B to the pitter D, attendants inspect and locate the peaches in the cups with the stem up or down. The combination of motions of cam 111 and crank 117 imparts to the lower end of each plunger 91 a motion shown in Fig. 3. The angles noted on Fig. 3, which diagrammatically shows the paths of the lower ends of plungers 91 and of knockout rods 94, are based upon the angle of rotation of crank pin 117, with 0° corresponding with the uppermost elevation of said pin. At the commencement of the cycle (0°), plunger 91 is at the top of its stroke at point $a$ and rod 94 is at the top dwell of its stroke at point $a'$. During the first 67½° of rotation, the plungers 91 index forwardly to position $b$ to meet the oncoming peaches, which are continuously moving rearwardly in cups 82, and also move downwardly somewhat during this angular rotation. Thereafter the plungers 91 move rapidly downwardly and also rearwardly, to point $d$ at 157½°, the plunger recessed portions 95 locating and centering the pit within the peach and pushing the pit down to hole 88 in the bottom of the cup 82. Meanwhile rod 94 continued its up position dwell to point $c'$ (90°) and then continued with plunger 91 to point $d'$. From point $d$ at 157½° to point $f$ at 202½° the plunger 91 dwells at the bottom of its stroke while the knockout rods 94 are ejecting the pits from the cups by moving down to point $e'$ at the bottom of the stroke (180°) and then retracts within the plunger at point $f'$. From point $f$ to point $h$ (292½°), plungers 91 rise and move rearwardly with the fruit. Then commencing at point $h$ and around past point $a$ to point $b$, the plungers index forwardly to meet the next advancing row of fruit. Meanwhile, knockout rods 94 reach the top of their stroke at point $g'$ (270°) and dwell at said elevation while plungers 91 continue to rise. It will be seen that the forward indexing of plungers are at the top of their stroke and that during the period while said plungers are in contact with the fruit, they move at the rearward speed of the fruit, thereby damaging the fruit as little as possible. The shape of the path of plunger 91, as shown in Fig. 3 is a skewed ellipse.

As the rows of cups approach the pitting mechanism D, plungers 91 are at the upper end of their stroke (point $a$ on Fig. 3) and are advancing forwardly to meet the peaches. Plungers 91 move downwardly, cutting downwardly through the meat at the top of the peach, locating the pit and centering the same with respect to hole 88 and finally moving down until the lower end of plunger 91 contacts cup 82, the pit being forced partially through hole 88 and meat being squeezed off the pit by reason of the resilient nature of cup 82. At the bottom of the stroke of plunger 91 knockout rods 94 push the pits the remaining distance through hold 88. Simultaneously with the downward movement of plunger 91, knives 96, the use of which is optional, have sliced the peach into halves, quarters, etc. Plunger 91 then moves upward, and if the peach-half tends to cling to said plungers 91, the same is dislodged by parallel transverse rods 151 attached to fittings 116 and extending across the machine alongside the rows of plungers 91. Meanwhile, plungers 91 are indexing forwardly to meet the next advancing row of peaches and knockout rods 94 have retracted within bores 93. The peach meats are carried along in conveyor C to the rear of the machine, and as the roller chains 51 make the bend around the sprocket 61, the meats are dislodged from the cups and fall by gravity into a container or conveyor placed under the rear end of the machine.

Apple coring

The mechanism, hereinabove described, has been restricted to a description of pitting of peaches and the like. It is also readily adaptable to coring of apples, only three changes being required, namely the cups holding the fruit, the plunger performing the coring operation and said timing of cam 130 with respect to cam 111. It is unnecessary to use rubber cups for apples since no squeezing of the meat from the core is required. Instead four single cups 161 are aligned to frame 52, as shown in Figs. 10 and 11. Cup depressions 162 are formed in said cup frame 161, said depressions being semispheroidal in contour to hold the bottom of an apple and being provided with grooves 163 in their surfaces to provide for holding the apple, and clearance for slicing knives 164 optionally carried by corer 166, as hereinafter described. (Fig. 11 shows knives 164 on the left-hand corer but not on the right-hand corer.) Apples are deposited in the cups 161 from feeder B, and the attendants at the inspection station inspect and locate the apples properly in the cups, calyx side up.

The shape of the corer 166 is shown in Fig. 11. It will be seen that said corer comprises a hollow tube within which moves knockout rod 94, said corer having an elongated, rounded point 167 formed as best shown in Fig. 11. In operation, said point 167 penetrates the apple as the latter moves rearwardly and corer 166 moves downwardly through the meat encircling the core until point 167 reaches the bottom of cup 162 whereupon knockout rod 94 pushes the core from inside corer 166 through hole 168 in the bottom of the cup. In other respects the operation of the apple coring modification of the machine is identical with the peach pitter. For certain types of peaches it is preferred to use a hollow cylindrical plunger such as disclosed in corer 166 in the peach pitter rather than the fluted plunger 91.

Although the present invention has been described in some detail by way of illustration and example for purposes of clarity of understanding, it is understood that certain changes and modifications may be made within the spirit of the invention and the scope of the appended claims.

We claim:

1. In a fruit pitting and coring machine, the combination of a conveyor having an extended horizontal stretch, fruit receiving pockets advanced by said conveyor, first means arranged continuously to advance said conveyor, a pitting and coring plunger elevated above a portion of the horizontal stretch of said conveyor, second means arranged to move the fruit engaging end of said plunger in a skewed elliptic path viewed in side elevation, said second means advancing said fruit engaging end in elevated position to a position over one of said pockets, then moving said fruit engaging end downwardly and in position over said pocket to cut around the pit or core of the fruit held in said pocket at the bottom of the path of said plunger, then elevating as said pocket continues to advance, and then moving forwardly to position to pit or core the fruit in the next pocket in order, the advancing, downward and elevating movements of the fruit engaging end of said plunger occurring while said pocket is proceeding along the horizontal stretch of said conveyor, said first means and second means operating in timed relation, said second means comprising a pivot elevated vertically above said conveyor, a pendulum rod swinging about said pivot with its lower end elevated above said conveyor, and a cross-head on which said plunger is mounted, said cross-head being mounted for axially slidable movement on said pendulum rod, a crank, a connecting rod connecting said crank and said cross-head to impart sliding movement of said cross-head on said pendulum rod, a cam fixed for rotation with said crank, and a cam-follower arm engaging said cam connected to said pendulum arm, said cam being shaped so that the resultant of rotation of said cam and crank moves said plunger in said path.

2. A machine according to claim 1 in which is further provided a knockout-rod slidable axially in a bore in said plunger, a second cross-head in which said knockout rod is mounted, said second cross-head being axially slidable on said pendulum rod independently of said first cross-head, a second cam rotatable in timed relation with said first cam, and a second cam-follower arm engaging said second cam and arranged to impart movement to said second cross-head, said second cam being shaped so that the resultant of movement of said pendulum arm and rotation of said second cam projects said knockout rod beyond the end of said plunger at the bottom of the stroke of said plunger.

3. In a fruit pitting machine, a rigid frame, said frame having an extended horizontal portion, a loading station at one end of said horizontal portion, a vertical portion of said frame at the opposite end of said horizontal portion from said loading station, a conveyor arranged for movement around said horizontal portion of said frame, first means for continuously driving said conveyor, a series of fruit receiving cups advanced by said conveyor, each having a pit-discharging annulus at the bottom, a pair of pendulum rods each mounted on one side of the machine adjacent the top of said vertical portion of said frame, a cross-head, a pair of slides fixed to said cross-head at each side of said cross-head slidable axially on said pendulum rod, a cam rotatable in timed relation to said conveyor, a crank fixed for equi-angular movement with said cam, a connecting rod connecting said crank and one of said slides to impart a vertically reciprocatory component of motion to said slide, a cam follower engaging said cam and connected to the lower end of said pendulum rod to impart a horizontally reciprocatory component of motion to said slide, and a fruit-pitting plunger rigidly mounted on said cross-head, the resultant of said motion components elevating and depressing said plunger in a path such that at the bottom of its stroke the bottom end of said plunger engages the bottom of one of said cups and in the course immediately before and after said last-mentioned position said plunger advances with a horizontal component of velocity substantially equal to the velocity of said conveyor and in the remainder of said course said plunger elevates out of contact with fruit in said cups and indexes to meet the next cup in order.

4. A machine, according to claim 3, which further comprises a second cross-head, a second pair of slides fixed to said second cross-head at each side of said second cross-head slidable axially on said pendulum rod, a second cam rotatable in timed relation to said conveyor, means for imparting motion from said second cam to said second crosshead, and a knockout rod rigidly mounted on said second cross-head and axially slidable within a bore in said plunger, the resultant of motion of said pendulum rod and said second cam projecting said knockout rod beyond the lower end of said plunger at the bottom of the stroke of said plunger to push a fruit pit out through the annulus of said cup.

References Cited in the file of this patent

UNITED STATES PATENTS

| Number | Name | Date |
|---|---|---|
| 397,691 | Briggs | Feb. 12, 1889 |
| 1,136,509 | Colborne | Apr. 20, 1915 |
| 1,610,236 | Ayars | Dec. 14, 1926 |
| 1,817,967 | Coons | Aug. 11, 1931 |
| 2,092,956 | Connor et al. | Sept. 14, 1937 |
| 2,097,170 | Wilson | Oct. 26, 1937 |
| 2,157,518 | Ashlock | May 9, 1939 |
| 2,243,530 | Kok | May 27, 1941 |